United States Patent [19]

Leroy

[11] Patent Number: 4,465,060

[45] Date of Patent: Aug. 14, 1984

[54] CURVED HEAT EXCHANGE APPARATUS FOR SOLAR HEATING AND AIR-CONDITIONING OF PREMISES

[75] Inventor: Claude Leroy, Marseilles, France

[73] Assignee: Sorelec, La Matte Saint Euverte Saint Jean de Braye, France

[21] Appl. No.: 366,255

[22] Filed: Apr. 7, 1982

[30] Foreign Application Priority Data

Sep. 14, 1981 [FR] France ............................ 81 17354

[51] Int. Cl.$^3$ .............................................. F24J 3/02
[52] U.S. Cl. .................................. 126/443; 126/432; 126/435; 126/437; 126/444; 126/450
[58] Field of Search ............... 126/435, 420, 436, 432, 126/437, 444, 450, 438, 443

[56] References Cited

U.S. PATENT DOCUMENTS

| | | | |
|---|---|---|---|
| 2,167,576 | 6/1939 | Iziser | 126/437 X |
| 4,027,821 | 6/1977 | Hayes et al. | 126/420 |
| 4,086,911 | 5/1978 | Futch | 126/437 X |
| 4,305,381 | 12/1981 | Misrahi et al. | 126/450 |
| 4,401,100 | 8/1983 | Slater et al. | 126/362 |

FOREIGN PATENT DOCUMENTS

| | | | |
|---|---|---|---|
| 2288954 | 5/1976 | France | 126/450 |
| 2437579 | 5/1980 | France | 126/420 |
| 2461210 | 3/1981 | France | 126/450 |
| 2476283 | 8/1981 | France | 126/435 |

Primary Examiner—Larry Jones
Assistant Examiner—Carl D. Price
Attorney, Agent, or Firm—Seidel, Gonda & Goldhammer

[57] ABSTRACT

This invention concerns an apparatus characterised in that the heat exchange surface is formed by passages with a vertical circulation, said passages being distributed in two groups, one serving for pre-heating by means of diffuse radiation and the other providing the heating action in the true sense, said two groups being connected in series in such a way that the heat-exchange liquid passes through the two groups of passages in an upward direction.

2 Claims, 1 Drawing Figure

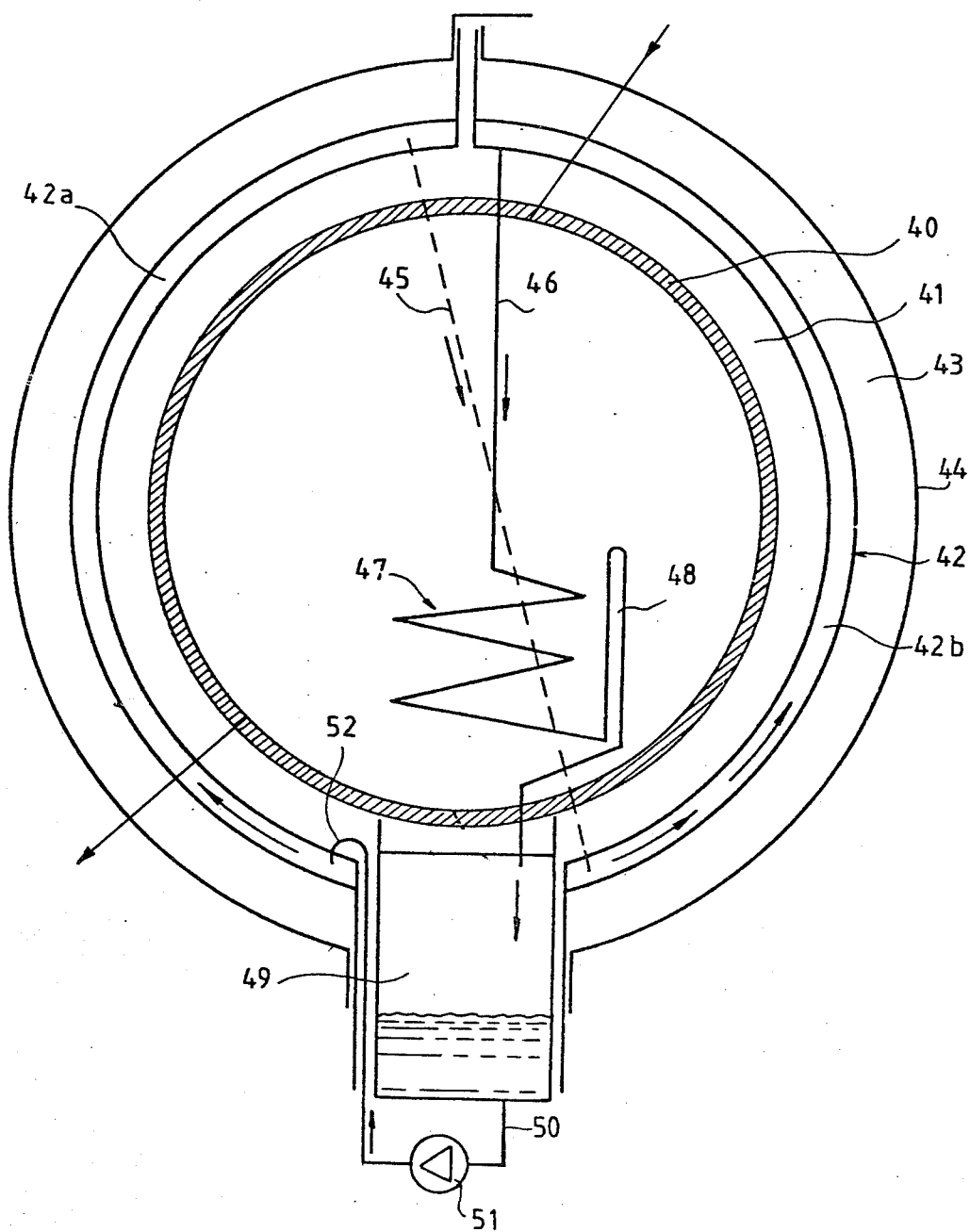

CURVED HEAT EXCHANGE APPARATUS FOR SOLAR HEATING AND AIR-CONDITIONING OF PREMISES

The present improvement concerns a curved heat exchange apparatus for the solar heating and air-conditioning of premises and the production of hot and cold sanitary water, comprising an exchanger and a storage volume, the apparatus having an internal enclosure forming the volume for storage of the primary heat-exchange fluid, an insulating casing means surrounding the storage volume, a heat exchange surface which is at least largely formed by the primary heat-exchange circuit, said exchange surface surrounding the insulating casing means, a transparent external casing means, the different casing means being in the shape of a spherical surface or in the shape of an ellipsoid.

It is profitable to develop this technique in order to favour the heat exchange and consequently, the global efficiency of the apparatus.

For this purpose, the improvement concerns an apparatus characterised in that the heat exchange surface is formed by passages with a vertical circulation, said passages being distributed in two groups, one serving for pre-heating by means of diffuse radiation and the other providing the heating action in the true sense, said two groupes being connected in series in such a way that the heat-exchange liquid passes through the two groups of passages in an upward direction.

By virtue of this circulation of the heat-exchange fluid with pre-heating by means of the diffuse radiation and heating by means of direct radiation, the level of efficiency of the apparatus is substantially improved.

According to another feature, the heat-exchange circuit comprises a heat exchange device of coil form, which is disposed in the internal casing, with the outlet of the coil being connected to an inverted U-bent member, of a height substantially corresponding to the coil.

That arrangement makes it possible to ensure that the heat-exchange liquid does not pass through the coil too rapidly as, by virtue of the U-bend, the liquid remains in the coil for a longer period of time and in particular completely fills the coil.

According to another feature, the outlet of the coil forming the heat exchanger or the inverted U-bent tube opening into a tank whose volume is greater than the volume of heat-exchange fluid, the latter can flow into the tank when the installation is in a stopped condition, with the upper part of that volume being open to atmosphere.

The tank makes it possible to avoid the difficulties involved with balancing pressures in a closed circuit. In contrast, as the circuit is open, it is not subjected to any increased pressure that makes it possible to use thin tubes, which in turn promotes heat exchange both at the receiving means and in the coil which is immersed in the liquid in the storage volume.

The present invention will be described in greater detail with reference to the accompanying single drawing, which shows a diagrammatical view in cross-section of an embodiment.

As shown in the FIGURE, the heat exchange apparatus in an alternative form comprises an internal envelope or casing 40 forming the storage volume. The casing 40 is surrounded by an insulation means 41 which is in turn surrounded by the exchange surface 42. The heat exchange fluid passes through the heat exchange surface 42 which is surrounded at a certain spacing by a transparent envelope or casing 44 so as to define a greenhouse-like chamber 43.

The exchange surface 42 is formed, very diagrammatically, by passages which rise from the lower portion to the upper portion (as shown in the drawing). The passages are subdivided into two assemblies 42a and 42b which, for the purposes of simplifying the description, are disposed on the left and on the right respectively, relative to the central vertical axis as viewed in the drawing.

The upper part of the assembly of passages 42a of the exchange surface is connected by way of the conduit 45 to the lower part of the assembly of passages 42b.

The upper part of the assembly of passages 42b is connected by a conduit 46 to the coil 47 for heat exchange with the liquid (water) contained in the casing 40.

The coil 47 is connected by way of an inverted U-bent member 48 to a tank 49, the volume of which is greater than the volume of the whole of the heat-exchange liquid so as to leave a volume of gas above the liquid in the tank 49 when all the heat-exchange liquid has returned to the tank after the circulating pump has stopped.

The height of the inverted U-bend 48 substantially corresponds to the height of the coil so that the coil pipe is always filled with heat-exchange liquid; in addition, that arrangement makes it possible to regulate the flow of fluid in the coil 47.

The coil 47 is disposed in the lower part of the casing 40.

At its base, the tank 49 is connected by way of a conduit 50 to a circulating pump 51, the output 52 of which opens into the lower part of the parallel passages 42a.

The circulation of the heat-exchange fluid is indicated by the arrows.

The above-described apparatus is advantageously oriented so that the passages 42b are exposed to the greatest intensity of solar radiation and the passages 42a receive the diffuse radiation.

Taking into account the direction in which the heat-exchange liquid circulates, that liquid first undergoes pre-heating in the passages 42a before passing into the heating region in the true sense, in the passages 42b.

The vertical arrangement of the passages 42a and 42b or any other equivalent means permitting vertical flow of the heat-exchange liquid in the exchange surface is highly attractive from the point of view of assisting with circulation and consequently increasing the efficiency of the heat exchange operation and the heat pumping operation.

Moreover, as the tank 49 at the outlet of the bend communicates with the free atmosphere, there is no problem in regard to increased pressure or more generally in regard to balancing pressures in this apparatus. This makes it possible for the circuit for the heat-exchange fluid to be formed by selecting thin conduits or tubes etc. which do not have to resist pressures other than the hydrostatic pressure of the heat-exchange liquid.

When the circulating pump 51 is stopped, virtually all the heat-exchange liquid returns to the tank 49.

Pre-heating of the heat-exchange liquid in a part of the exchange surface is an interesting design which provides for an increase in efficiency in the installation.

Finally, the conduit for supplying water or liquid to the internal volume 40 and the conduit for removing water or liquid therefrom are not shown in the drawing.

Advantageously, the passages 42a and 42b of the exchange surface 42 are formed by a double wall, the internal volume of which is vertically partitioned.

In accordance with an interesting alternative embodiment (not shown), the passages 42a and 42b comprise transparent walls and the heat-exchange liquid is coloured black. This therefore produces a "retractible" exchange surface 42 since, when the apparatus is stopped, as the liquid returns to the tank and the walls are transparent, they reveal the internal volume 40 which will advantageously be provided with suitable decoration; such walls comprise for example two transparent spheres. This is an attractive design in particular if the apparatus is of substantial dimensions, as that would enable it to be integrated into the environment.

I claim:

1. A solar energy conversation system comprising an internal enclosure forming a volume for storage of secondary heat exchange fluid; an insulating casing means surrounding said internal enclosure; a heat exchange surface exterior of said insulating casing means; a transparent external casing means enclosing said heat exchange surface; and an internal heat exchanger within said internal enclosure and through which flows primary fluid; said internal enclosure, insulating casing, heat exchange surface and transparent external casing being generally spherical surfaces, said heat exchange surface and said internal heat exchanger forming a primary heat exchange circuit through which flows the primary fluid, the primary heat exchange circuit including a first and second passage formed by said heat exchange surface, means fluidly connecting the first and second passages, the primary fluid being preheated within the first passage by diffuse radiation and being further heated within the second passage by direct radiation, the flow of fluid through the first and second passages being in an upward direction, said second passage having an outlet, said internal heat exchanger having an inlet communicating with the outlet of the second passage and an outlet which includes an inverted U-shaped bend, the U-shaped bend being substantially the internal highest point of the heat exchanger; the primary heat exchange circuit further including a tank into which the inverted U-shaped bend communicates and a circulating pump connected to a lower part of the tank for discharging said primary fluid into a lower part of the first passage, the volume of the tank being greater than the total volume of the primary heat exchange fluid; the tank upper end portion being open to the atmosphere.

2. The system according to claim 1 in which the heat exchange surface is formed by a double wall forming a double wall internal volume, said double wall internal volume being partitioned to form the first and second passages.

* * * * *